Dec. 27, 1966     J. TRÉMEAU     3,294,116

NON-REFLUX VALVES

Filed April 25, 1963

*INVENTOR*
JEAN TRÉMEAU

BY Phillip A. Weiss
*ATTORNEYS*

3,294,116
NON-REFLUX VALVES
Jean Tremeau, c/o Societe des Clapets, Boile Postale 142,
Chalon-sur-Saone, France
Filed Apr. 25, 1963, Ser. No. 275,711
4 Claims. (Cl. 137—541)

This invention relates in general to valves used for regulating fluid flow and more particularly to non-reflux valves.

This type of valve comprises a valve member which normally rests on a seating within a casing. Flow occurs in only one direction when the valve member is moved from the seating by a pressure differential. In the non-flux direction the pressure differential retains the valve member on the seating. Check valves, foot valves and relief valves are some examples of valves that exhibit the non-reflux characteristics. Many other examples could be cited by those skilled in the art.

Some forms of unidirectional or non-reflux valves include a spring to ensure that the valve member will normally be maintained in engagement with its seating, and while such a spring may be embodied in a valve when constructed in accordance with the present invention, the presence of a spring is not essential to the invention in all of its applications.

The characteristics of many one-way valves are determined by providing a valve member in the form of a ball which returns to its seating as soon as the flow of fluid which moves it from its seating is interrupted or falls to a predetermined low pressure at the underside of the valve.

This well-known system employing a ball has a number of disadvantages. For one thing, due to repeated movements of the ball to and from its seating, there is a tendency for the ball and seating to become irregularly worn, thereby reducing the valve sealing effect when the ball is in its seated position. This irregular wear can be attributed to the fact that the fluid flowing through the valve casing causes the ball to rotate so that it eventually return to its seating in different surface positions. For another thing, the ball when borne by the flowing fluid cannot maintain a truly central position owing to the clearance that has to be provided around it to allow for the flow. Consequently the ball eventually returns to its seating from different angles, thus tending to impose irregular wear on the seating, and on the ball itself. Another disadvantage is that the use of a ball necessitates providing an arresting means within the casing to limit the amount by which the ball can move from its seating. Such means have a throttling effect on the flow of fluid when the valve is open.

The object of the present invention, in general, is to provide one-way valves which have substantially the same simplicity as one-way valves having ball valve members but having none of their disadvantages.

To attain this object, a valve member has been conceived having in general the form of an octopus, the head constituting the obturator and the tentacles (fingers) forming the guide.

More specifically, one of the objects of the invention is to provide one-way valves, which, when in closed position, will maintain an effective, leakproof seal over a long period of use of the valve, without the necessity for overhaul or replacement.

Another object of the invention is to provide automatic one-way valves which will operate effectively, both in opening and closing, even under low pressure conditions, and in such a manner that any distortion or detrimental wear of the working parts will be avoided.

To provide a valve member that is as frictionless as possible and still provides a good seal in any position without resorting to heavy controlling devices which would cause important losses of pressure, the cone of the valve member is moulded over a core, with a density that is specifically suited to the intended use of the valve-member.

Thus, still another object of this invention is to provide a valve member that can be used as obturator in valves or other apparatuses destined to work in vertical, horizontal or inclined positions. The overall density of the valve member is regulated by moulding the valve member over an insert of a desired density. The density of the valve member can thus approach the density of the fluid to be handled and hence avoid unnecessary friction. If required, a spring or light controlling device can be provided to make sure that the valve member returns to its seat, when the pressure which pushes it away from the seating ceases.

A still further object of the invention is to provide one-way valves with parts so constructed that while arresting means are provided for limiting the amount by which the valve proper can move from its seating such means will have only a minimum, immaterial throttling effect on the flow of fluid through the valve when in open position.

Still another object of the invention is to provide a unidirectional valve with parts so constructed that these parts can be assembled in almost the same simple manner as in one-way valves employing only a ball as the valve proper.

An even further object of the invention is to provide one-way valves which, in certain applications, are capable of working effectively in any desired angular position.

According to one aspect of the invention, a one-way valve comprises a casing formed with a neck or a throat constituting a guideway and having a seating at one of its ends and movable valve member comprises an egg shaped head that normally rests on the seating and closes against the flow of fluid in one direction through the casing. The head is provided with a series of depending tentacles or fingers which co-operate with the guideway to cause the head to travel in a straight, or substantially straight, line during its opening and closing movements. The free ends of the fingers are shaped to engage with the other end of the neck or throat so as to limit the amount the head can move away from the seating.

For a purpose to be described, the aforesaid tentacles or fingers may be flexible.

Reference is now made to the accompanying drawings which illustrate a preferred embodiment of the valve of the invention. In the drawings.

Figure 1:
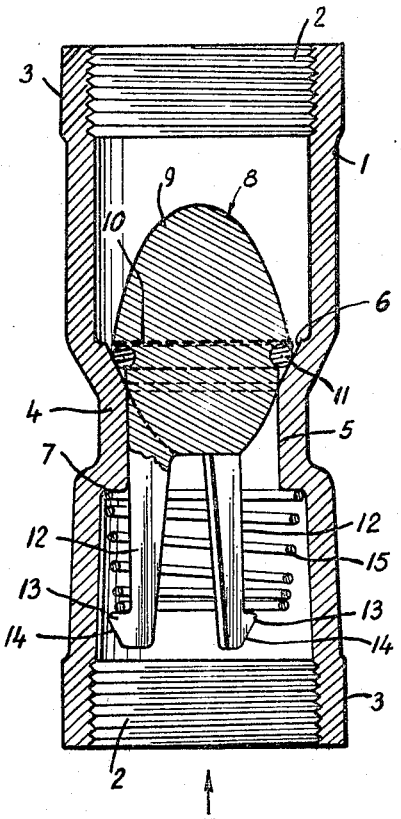
FIGURE 1 is a vertical sectional view of a check valve.

As shown in the drawings, the valve comprises a tubular casing 1 which will usually be made of metal. At its ends, the casing 1 is formed with internal pipe threads 2 surrounded by hex nut portions 3 enabling the casing to be joined to the pipe threaded ends of inflow and outflow pipes (not shown), the direction of flow being indicated by the arrow F in FIGURE 1.

Between its ends, the casing 1 is formed with a throat or neck 4 (FIGURE 1) the internal cylindrical surface of which constitutes a guideway 5. The upper end of the guideway 5 merges into a conical seating 6 (FIGURE 1), while the lower end of the guideway terminates in a surrounding annular shoulder 7.

In combination with the casing 1 when constructed as just described, there is provided a valve member generally indicated at 8.

The valve member 8 comprises an Octopus-form consisting of an egg shaped head 9 and tentacles 12 depending therefrom; a sealing ring 11 may surround the lower part of the head. The number of tentacles may vary but these tentacles are equally spaced from each other around the vertical axis of the head from which they depend.

The tentacles 12 are flexible and pass through the guideway 5, their outer vertical edges lying in sliding engagement with the guideway so that, in conjunction with the latter they act to guide the head 9 in a straight line during upward and downward movement of the valve member. The lower extremities of the tentacles are formed in shape of claws 13 and the claws 13 act as cams to limit the upward movement of the valve member. Of course, these tentacles are quite thin and hence present no noticeable obstruction to the flow of fluid, but their engagement with the wall of the guideway serves to restrain the valve member from rotating about its vertical axis.

The particular egg shape possessed by the lower part of the valve head 9 causes the fluid to move as an annular jet outwardly at an angle towards the wall of the upper part of the casing 1 in order to sweep over the seating 6 without causing erosion and to keep the seating free of particles of dirt to maintain it in a clean condition. The particular egg shape possessed by the upper part of the valve head 9 minimizes eddys and cross flows and thus contributes to the unimpeded flow of the fluid through the valve.

Figure 2:
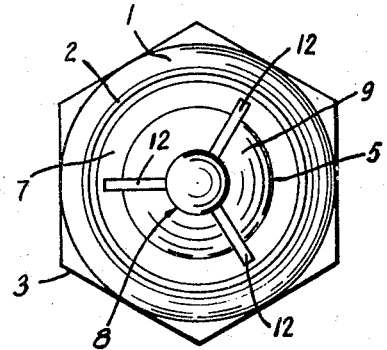
FIGURE 2 is an inverted plan view corresponding to FIGURE 1, but with one of the parts omitted for convenience of illustration.

While not essential to the practical application of the invention in all its forms, the embodiment illustrated includes a spiral compression spring 15 (FIGURE 1) arranged between the shoulder 7 and the upper edges of the claws 13 on the tentacles 12, the spring acting normally to maintain the valve in closed position. For convenience of illustration, the spring is not shown in FIGURE 2.

The spring 15, when provided, ensures that the valve member 8 will not have to depend solely on the effect of gravity or back-pressure to cause it to return to closed position when the pressure acting to open it ceases or falls sufficiently. The spring 15 thus ensures that the valve will function correctly irrespective of the position in which it is placed as a whole, that is to say, irrespective of whether it is placed vertically as shown, or horizontally, or at an upward or downward inclined angle, or is completely inverted.

A number of materials can be used in the manufacture of the valve member 8 and the sealing ring 11, the choice of materials depend on conditions and requirements. Among such materials which may be mentioned are certain kinds of synthetic resins that when used as the valve head 9 and tentacles 12, give these parts sufficient inherent rigidity with the requisite degree of flexibility for the tentacles 12.

The valve head and tentacles 12 may be moulded or otherwise formed in one piece.

Figure 3:
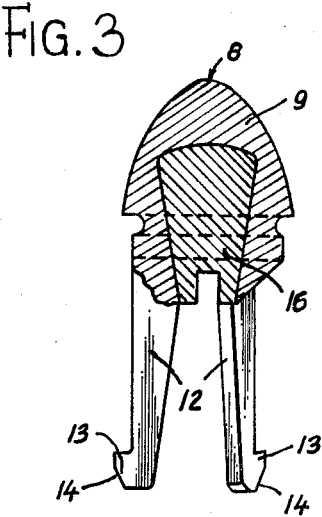
FIGURE 3 is a vertical section view of the valve member showing the position of the core insert.

In the interior of valve member (FIGURE 3) is core insert 16. This core may be made of various materials, such as a plastic or other light material, or a heavy metal such as lead.

Core 16 offers, moreover, the advantage of realizing a valve member that can be taken from the mould shrinkage free.

It goes without saying that the utilization of a core is not restricted to the design of this valve which has been mentioned as an example; on the contrary, it includes a variety of embodiments.

When the invention is used as a foot-valve, the part of the casing lying below the shoulder 7 will usually be omitted, and replaced by a perforated strainer suitably secured by its upper end, around the neck or throat 4.

While the principles of the invention have been described above in connection with specific apparatus and applications, it is to be understood that this description is made only by way of example and not as a limitation on the scope of the invention.

What is claimed is:

1. A unidirectional valve for enabling the flow of fluid in only one direction, comprising a casing having a passage therethrough for the flow of said fluid, said casing having an integral constricted portion terminating in a seating at one end thereof and a shoulder at the other end thereof, said constricted portion forming a guideway in said casing, a movable egg shaped valve member, said valve member having a plurality of flexible vane like appendages dependent therefrom, said vane like appendages having a flat rectangular cross-section extending radially to the axis of fluid, said valve member normally resting on the seating to preclude fluid flowing in one direction and moving from said seating responsive to fluid flow in the other direction, said appendages extending through said constricted portion with the outer edges of said appendages being in sliding engagement with the inner walls of said constricted portion so that the travel of said valve member is restricted to a substantially straight line motion, said appendages terminate in laterally projecting claws, said claws lying in vertical alignment with said constriction and helical coil spring means floating between said claws and said shoulder without being anchored to either said claws or said shoulder, whereby said egg shape said vane like appendages and said floating spring cooperate to substantially eliminate rotational movement of the valve.

2. A valve member in accordance with claim 1 wherein said tentacle like appendages are equally spaced around the vertical axis of said valve member.

3. A valve member in accordance with claim 1 which is moulded over a core of a density selected so that the total density of said valve member can be varied according to the density of the fluid in which it is destined to work.

4. A valve in accordance with claim 3 wherein an "O" ring fits around said member at the point of its contact with said seat.

References Cited by the Examiner
UNITED STATES PATENTS

| | | | |
|---|---|---|---|
| 1,896,729 | 2/1933 | Jakubec | 137—541 X |
| 1,897,492 | 2/1933 | Ledoux | 137—433 |
| 2,769,457 | 11/1956 | Wittenberg | 137—533 XR |
| 2,114,921 | 6/1938 | Gessner | 137—529 |
| 3,001,546 | 9/1961 | Salisbury | 137—541 |

WILLIAM F. O'DEA, *Primary Examiner.*

D. H. LAMBERT, *Assistant Examiner.*